Dec. 9, 1924.

A. L. JOHNSTON, JR

TIRE CHAIN

Filed Nov. 11, 1920

1,518,515

Patented Dec. 9, 1924.

1,518,515

UNITED STATES PATENT OFFICE.

A. LANGSTAFF JOHNSTON, JR., OF NEW YORK, N. Y., ASSIGNOR, BY MESNE ASSIGNMENTS, TO OFF'N'ON CHAIN CORPORATION, OF NEW YORK, N. Y., A CORPORATION OF DELAWARE.

TIRE CHAIN.

Application filed November 11, 1920. Serial No. 423,219.

*To all whom it may concern:*

Be it known that I, A. LANGSTAFF JOHNSTON, Jr., a citizen of the United States, residing at New York, in the county of New York and State of New York, have invented certain new and useful Improvements in Tire Chains, of which the following is a full, clear, and exact description, such as will enable others skilled in the art to which it appertains to make and use the same.

This invention relates to anti-skid chains for automobile tires and more particularly to such devices provided with quick-detachable cross chains.

It is an object of the invention to provide reliable and efficient anti-skid chains capable of quick and easy repair.

It is another object of the invention to provide an anti-skid chain whose cross members may be readily removed and replaced.

It is a further object of the invention to provide an anti-skid chain which is capable of cheap manufacture and assembly.

Other objects will be in part obvious and in part pointed out hereinafter.

In the accompanying drawing wherein is illustrated a preferred embodiment of the invention, Fig. 1 is a plan view of a section of a tire chain;

Figure 1:
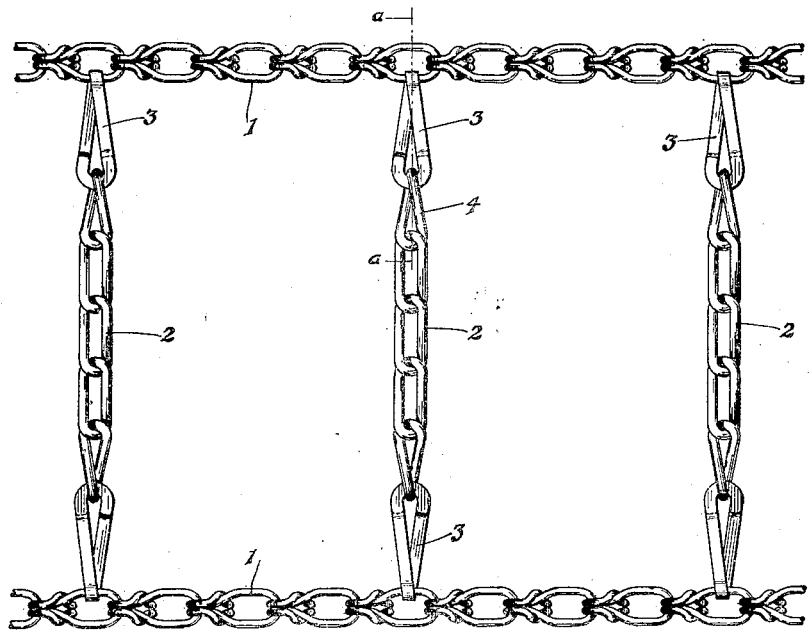
Figures 2, 3:
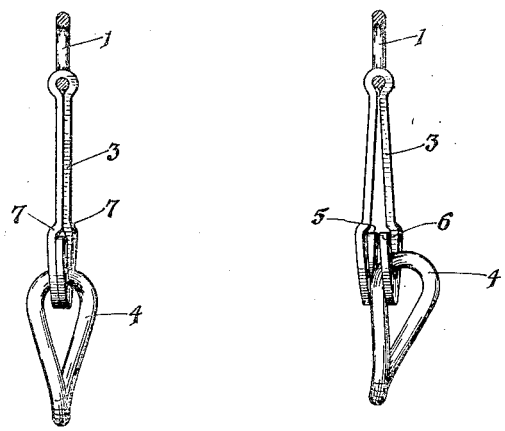
Fig. 2 is a fragmentary cross-section taken on the line a—a of Fig. 1.
Fig. 3 is a similar cross-section showing a link in the process of removal.

In general arrangement of parts and in operation the anti-skid apparatus employed is similar to standard devices for accomplishing the same result. Two circumferential chains 1, 1 adapted to lie against the tire are joined by a plurality of cross chains 2, which extend over the tread of the tire and furnish ground gripping means for preventing skidding. By the present invention each of these cross chains 2 is fixed to the side chains by links 3 which are so constructed that a worn or broken cross chain may be readily removed and a new one substituted therefor. The link 3 in the present embodiment consists of a flat band which is bent intermediate its end on its major axis to form an eye adapted to extend around and grip a strand of a link of the side chain 1 in such a manner so as to prevent the link 3 from turning on its longitudinal axis while permitting pivotal movement thereof on said side strand as a pivot. From the connecting eye of the connecting link 3, the sides of the link diverge in the plane of the link, terminating at the opposite end of the link in reversely disposed, closely contiguous overlapping hooks. This connection of the connecting links 3 with the side chains holds them always in position so their flat sides contact with the tire. At the same time the flattened resilient stock adjacent the connecting eye of the link and along the diverging sides thereof is capable of lateral flexing so the reversely disposed hooks can be easily spread apart for the insertion of one of the links of the cross chain. Figs. 1 and 2 show the link 3 holding a link of the cross chain 2 in normal or operative position. If, for any reason, it is desired to remove one of the cross chains, the link 4 of the cross chain which is threaded through the member 3 is forced over the end 5 of one of the hooks, between the sides of the member 3 as shown in Fig. 3, and slipped off over the end 6 of the other hook. The other end of the cross chain is detached in the same way. A new cross chain may then be attached by the same process so that the operation of removing one chain and substituting another for it is thus quickly and easily accomplished merely by manipulation of the chains.

In the operative position, tension on the chain 2 precludes any possible displacement of the link 4 within the member 3 and the closed relationship between the overlapping hook ends further resists accidental displacement. In the form shown, additional means for locking the ends of the two hooks are provided. The plane of the hooks is inclined slightly from that of the sides of the link 3 and these side pieces are bent slightly outwardly to form shoulders 7 under which the extremities of the hooks 5 and 6 rest. A link 4 of one of the cross chains will normally seek the lower curve of the member 3, as in Fig. 2, but the chain link may of course take various positions within the encircling hook link. The shoulders on the sides of the hook links, as above described, form guards for the ends of the hooks, so that there will be no tendency for a chain link to be accidentally wedged between the sides of the split link, while at the same time intentional removal will not be inconvenienced.

It will be evident that a reliable connection is provided between the side chains and the cross chains while at the same time ready disconnection is allowed upon suitable manipulation of the chains. In devices of this kind the cross chains bear the brunt of the wear and it is ordinarily necessary to remove broken cross chains and substitute others therefor many times before the side chains are damaged. By the device illustrated and described such replacement is made easy without a sacrifice in efficiency of operation.

Since certain alterations in the above construction might be made without departing from the spirit of the invention, it is intended that all matter contained in the above description or shown in the accompanying drawings shall be interpreted as illustrative and not in a limiting sense.

Having described my invention, what I claim as new and desire to secure by Letters Patent is—

In anti-skid chains for automobile tires, in combination, two circumferential side chains, each comprising a plurality of connected links, a plurality of elongated connecting links permanently connected to spaced links of each of said side chains, each of said connecting links being constructed of flattened resilient stock bent into overlapped relationship intermediate its ends to form at one end of the link an eye for connection to a side chain link, said eye being adapted to grip said side chain link to hold the connecting link so as to resist turning movement on its longitudinal axis, thus restraining it to assume a position with its flat side presented to the tire surface while permitting pivotal movement on the side chain link toward or from the tire, said connecting link having sides diverging in the plane thereof from the connection with said side chain and terminating in reversely arranged overlapping hooks, closely contiguous but separably yieldable through said diverging sides, and cross chain members having links adapted to be releasably engaged with said overlapping hooks.

In testimony whereof I affix my signature in the presence of two witnesses.

A. LANGSTAFF JOHNSTON, JR.

Witnesses:
L. A. WATSON,
M. A. CASHIN.